US010056016B2

(12) United States Patent
Truijen

(10) Patent No.: US 10,056,016 B2
(45) Date of Patent: Aug. 21, 2018

(54) TRANSPORTABLE SIGN

(71) Applicant: TROTTER PROPERTIES B.V., The Hague (NL)

(72) Inventor: Michaël Truijen, The Hague (NL)

(73) Assignee: TROTTER PROPERTIES B.V. (NL)

( * ) Notice: Subject to any disclaimer, the term of this patent is extended or adjusted under 35 U.S.C. 154(b) by 268 days.

(21) Appl. No.: 14/890,798

(22) PCT Filed: May 14, 2014

(86) PCT No.: PCT/EP2014/059893
§ 371 (c)(1),
(2) Date: Nov. 12, 2015

(87) PCT Pub. No.: WO2014/184269
PCT Pub. Date: Nov. 20, 2014

(65) Prior Publication Data

US 2016/0078790 A1 Mar. 17, 2016

(30) Foreign Application Priority Data

May 14, 2013 (EP) .................................... 13167612
Jul. 22, 2013 (EP) .................................... 13177397

(51) Int. Cl.
*G06F 17/00* (2006.01)
*G09F 15/00* (2006.01)
*G09F 7/20* (2006.01)

(52) U.S. Cl.
CPC ............ *G09F 15/0056* (2013.01); *G09F 7/20* (2013.01); *G09F 15/0012* (2013.01);
(Continued)

(58) Field of Classification Search
USPC .................. 40/601, 603, 607.14; 38/102.91; 160/380, 392, 395
See application file for complete search history.

(56) References Cited

U.S. PATENT DOCUMENTS 2,897,889 A * 8/1959 Kessler .................... B07B 1/48 160/392
4,472,862 A * 9/1984 Bloomfield .......... A01G 9/1407 160/392
(Continued)

FOREIGN PATENT DOCUMENTS

EP 0678842 A1 4/1995
EP 2346018 A1 1/2011
(Continued)

OTHER PUBLICATIONS

International Preliminary Report on Patentability; dated Sep. 16, 2015 for PCT/EP2014/059893.

*Primary Examiner* — Joanne Silbermann
(74) *Attorney, Agent, or Firm* — Mendelsohn Dunleavy, P.C.

(57) ABSTRACT

A transportable sign for temporary advertising is provided comprising a display portion configured to carry a flexible display medium (10) to display an image, wherein the display portion comprises a frame (9) at least partly surrounding the display portion and having sets of adjacent first and second grooves (35, 37) around the display portion, the second groove (37) being outward from the first groove (35) relative to the display portion, the first groove having opposing first groove walls (35A, 35B). The sign further comprises a clamp (39) having a clamp body (41) to be received in the first groove (35) and having a flange (43). The first groove (35) and the clamp (39) are arranged to clamp the flexible display medium (10) between the clamp body (41) and at least one first groove wall on insertion of the clamp body (41) into the first groove (35), and the first and second grooves (35, 37) and the clamp (39) are arrangeable such that on insertion of the clamp body (41) into the
(Continued)

first groove (35) for clamping the display medium (10), the flange (43) of the clamp (39) covers the second groove (37).

18 Claims, 9 Drawing Sheets

(52) U.S. Cl.
CPC ...... *G09F 15/0018* (2013.01); *G09F 15/0025* (2013.01); *G09F 15/0037* (2013.01)

(56) References Cited

U.S. PATENT DOCUMENTS

| | | | | |
|---|---|---|---|---|
| 5,242,004 | A * | 9/1993 | Stilling | E04L 37/00 135/117 |
| 9,257,062 | B2 | 2/2016 | Molenaar et al. | |
| 2006/0026877 | A1 | 2/2006 | Dike et al. | |
| 2007/0012411 | A1* | 1/2007 | Weight | G09F 15/0025 160/395 |
| 2007/0241255 | A1 | 10/2007 | Dvoracek | |
| 2010/0024271 | A1* | 2/2010 | Seidler | A47F 7/147 40/711 |

FOREIGN PATENT DOCUMENTS

| | | | |
|---|---|---|---|
| NL | 1036520 | C2 | 8/2009 |
| WO | WO2003088196 | A1 | 10/2003 |

* cited by examiner

TRANSPORTABLE SIGN

TECHNICAL FIELD

The present disclosure relates to signs, in particular to signs for displaying advertisements, more in particular to transportable signs for temporary advertising.

BACKGROUND

In the field of advertising there is a strong desire for reduced times and efforts in erecting a sign and/or exchanging display media such as printed sheets. This applies in particular for temporary outdoor signs, where further trade-offs tend to be required between portability for transport and/or storage, time for erecting the sign, time for putting up or replacing the display image, stability and robustness of the sign and public acceptability and aesthetics. The latter is of great concern for obtaining permits for placing and exploiting the sign, in view of the marked division between permanent signs and temporary signs.

Permanent signs are generally relatively large objects mounted to large counterweights fixed on or in soil to remain in position for several years and generally up to several decades, e.g. being integrated in permanent objects such as divider cabinets for electrical or water mains supplies and/or public transport stop shelters. In view of the intended long periods of use, local governments, e.g. city councils or municipalities, tend to allow such signs sparingly and tend to have extensive procedures for obtaining a permit to place and/or operate the sign. For economical exploitation of the sign prolonged contracts with advertisers may be required; an empty sign gives a poor impression to viewers and allowing an advertisement to be displayed for longer periods than initially agreed may reduce market value of advertising campaign and/or the sign operator.

Temporary signs provide the benefit of allowing the sign to be put up when required e.g. when a campaign is started and removed when the campaign is ended. Thus a certain surprise effect is provided to the advertisement. At the same time, a “clean” presentation should be provided. Typical examples of temporary advertisement campaigns are product introductions, temporary exhibitions, seasonal actions and elections. A temporary sign may be removed when the advertisement area is not sold or rented so that empty signs are prevented. Temporary signs further usually require “lighter” permits which may be handed out easier than permits for permanent signs.

With this in mind, the present applicant and its affiliates have successfully provided the transportable sign according to EP 2 346 018, which comprises a base portion, a support portion, and a display portion, movable with respect to the support portion.

Herewith, improvements to such transportable sign are provided.

It is noted that WO 03/088196 relates to a panel hanging system. According to this document, securing at least a first portion of a panel to a surface generally includes a base plate that is secured to the surface and a rail that is engaged by the base plate and that defines a first channel capable of receiving the first portion of the panel. The surface may include a billboard and the panel may include an advertisement applied to the billboard. A cover may be secured over the rail. The cover may include an outwardly extending tongue that engages the first channel to secure the first portion of the panel in the first channel. At the top edge of the frame, a welt included in the panel may be threaded through the first channel. On the remaining sides, the panel is stretched over the channel and the outer cover is snapped into place such that the tongue pushes the panel against the side walls of the channel. In some installations where the panel is not large or subject to windy conditions, the panel may omit the welt and all sides of the panel may be secured to the rail using the covers that pinch the panel into the channels.

SUMMARY

Herewith signs and methods according to the appended claims are provided.

In an aspect, a sign is provided comprising a display portion configured to carry a flexible display medium to display an image. The display portion comprises a frame at least partly surrounding the display portion and having sets of adjacent first and second grooves around the display portion, the second groove being outward from the first groove relative to the display portion. The first groove has opposing first groove walls. The sign further comprises a clamp having a clamp body to be received in the first groove and having a flange. The first groove and the clamp are arranged to clamp the flexible display medium between the clamp body and at least one first groove wall on insertion of the clamp body into the first groove, and the first and second grooves and the clamp are arrangeable such that on insertion of the clamp body into the first groove for clamping the display medium, the flange of the clamp covers the second groove.

Thus, the flexible display medium, e.g. a printed sheet such as paper, cloth, sail or tarp, may be clamped to the frame and pulled taut between opposing frame portions along the circumference. Excess rim portions of the display medium can be received and stored in the second groove and be hidden from sight by the flange. Thus, the display medium can be rapidly mounted by removing the clamps, arranging at least a portion of the display over the first groove, placing the clamp over the first groove and pressing the display medium with the clamp body into the first groove such that these are received tightly and clampingly within the groove. Any excess display medium material, e.g. due to tolerances in manufacturing, mounting and/or tightening of the display medium can be accommodated by storing the material neatly away into the second groove and covering that with the flange. Thus, the display medium may be rapidly mounted and/or exchanged to an aesthetically pleasing sign. Also, due to the clamping between the groove and the clamp body the display medium being may be mounted without requiring attachment fixtures in the display medium like eyes, hooks, zippers etc. Nevertheless, such attachment fixtures may be provided. This reduces costs and handling time and it allows avoiding localised forces on the display medium. It also facilitates continuous attachment and/or arrangement since the relative positions of the display medium and the clamping mechanism (groove and clamp) may be freely selectable, whereas attachment fixtures dictate placement positions.

In an embodiment, the display portion has a front side for displaying the image and the first and second grooves are recessed into the frame and are open generally towards the front side. This facilitates mounting the display medium since the front side is generally well accessible for easy viewing.

In an embodiment, the first groove has a first groove wall on an inward side relative to the display portion, the first groove wall extending from into the frame at an angle that is at least perpendicular to the front side, preferably at a reverse angle so that an acute angle is enclosed between the wall and the front side, e.g. as defined by a plane of the display medium. In an embodiment the first groove wall has a rim portion protruding into the groove, so that at least part of the display medium may be bent over the rim more than 90 degrees. In an embodiment, the first groove has an open shape, in transverse cross-section, with a relatively narrower entrance and a relatively wider portion behind the entrance, which may increase a retention force on the clamp body. Such arrangements facilitate pulling the display medium taut and securing the display medium with the clamp. In general it is found that the smaller the bending radius and the larger the bending angle required of the display medium, the better the retention force of the display medium and the lower the clamping force that is required of the clamp body. This may lead to a lower insertion force of the clamp body into the groove, therewith facilitating mounting.

In an embodiment, the clamp body has one or more portions with elevated friction, teeth and/or toothed ribs to engage and grip a portion of the flexible display medium. In particular, the teeth may be asymmetric and point in a direction of the pulling force. Thus, tension and holding force of the clamp onto the display medium may be increased.

In an embodiment, at least an entrance of the second groove is relatively wider than that of the first groove. This facilitates insertion of excess display material.

In an embodiment, the frame comprises a recess comprising the first and second grooves, the recess being configured to receive the flange of the clamp. Thus, the clamp may be received smoothly into the frame, further increasing aesthetics and reducing accumulation of dirt.

The frame may comprise a modular and/or self-supporting profiled structure, e.g. an extrusion profile. This reduces manufacturing costs and facilitates manufacturing signs of various sizes.

In an embodiment, the sign comprises a base portion, a support portion, and a display portion, wherein the display portion comprises the frame, wherein the base portion is configured to position the sign, by supporting the support portion and the display portion, and wherein the support portion is configured to support the display portion, when mounted to or on the base portion; wherein further the display portion is mounted or mountable to the support portion to form a transformable assembly such that, when mounted to the base portion, the display portion is positionable in and movable over the support portion between at least a first, relatively high, position and a second, relatively low, position with respect to the base portion. This facilitates transport and erection of the sign. It also facilitates mounting or exchange of the display medium. It also enables provision of sign configurations with different heights of the display portion.

In such sign the display portion may envelop the support portion and be slidable over the support portion and fixable to the support portion in at least two different relative positions. Thus, the display portion covers the support portion and an aesthetically pleasing sign is provided in at least two configurations.

In an embodiment, the sign comprises a base portion, a support portion, and the display portion, wherein the base portion is configured to position the sign, by supporting the support portion and the display portion, and the support portion is configured to support the display portion, when mounted to or on the base portion. Further, the base portion and the support portion comprise mated first and second connectors for releasably coupling the base portion and the support portion, wherein the first and second connectors comprise guiding features to guide the base portion and the support portion into predetermined relative orientations. This facilitates assembling and partly disassembling the sign for erecting, transporting and/or storing it.

In such sign, the base portion may comprise the first connector and a mated third connector, such that two generally similar or identical base portions are connectable to each other via their first and third connectors, respectively. Preferably the third connector is generally identical to the second connector of the support portion. Preferably, the first connector is on a first, e.g. top side and the third connector is on an opposite side, e.g. bottom side of the base. This facilitates transport and/or storage by stacking base portions on each other.

In an embodiment, the base portion comprises a levelling prop which is height-adjustable with respect to the base portion, to adjust the position and/or orientation of the base and/or the entire sign when placed. Preferably, a plurality of levelling props is provided. Height adjustment is efficiently and reliably realised if the levelling prop is screwable with respect to the base portion.

The levelling prop may comprise a support end at one end arranged at a bottom side of the base portion and a connection end or coupling end at another end arranged towards a top side of the base portion and operable from the top side of the base portion, e.g. extending through the base portion. In such case adjusting the levelling prop is facilitated and an operator need not access the levelling prop underneath the base portion such that operator safety is improved. The connection end of the levelling prop may comprise a coupling for coupling to an operating tool for adjusting the levelling prop. This allows to remove the operating tool, reducing costs, and further it reduces options for vandalism.

In an embodiment, the sign comprises a hoisting connection, comprising an eye or a hook that is movably connected to the sign in a recess on top of the sign. Thus, the hoisting connection may be hidden or at least be rendered less conspicuous from a normal view point of an observer yet still be readily accessible for use. The recess may be arranged on top of the display portion.

In an aspect, a carrier for at least one support portion of the sign as described herein is provided, the carrier comprising a carrier connector for connecting to the second connector for releasably coupling the carrier and the support portion, wherein the carrier connector and the second connector comprise guiding features to guide the support portion into a predetermined relative orientation with respect to the carrier portion, and wherein the carrier optionally comprises a locking system to lock the support portion to the carrier. Preferably, the carrier is configured for carrying a plurality of support portions and/or display assemblies comprising a support portion and a display portion.

In an aspect, a sign is provided which comprises a display portion configured to carry a flexible display medium to display an image. The display portion comprises a frame at least partly surrounding the display portion and fixation means to fix the flexible display medium to the frame. The frame has at least one first groove around the display portion, the first groove having opposing first groove walls. The fixation means comprises the first groove and a clamp having a clamp body to be received in the first groove and thus clamp a portion of the flexible display medium between the clamp body and at least one first groove wall of the first groove. The sign further comprises connectors for attaching the flexible display medium to the sign prior to fixing the flexible display medium to the frame with the fixation means. In particular, the connectors allow adjustable attachment of the display medium allowing adjustment of the position of the display medium relative to the display portion.

Thus, the display medium can be rapidly mounted by removing the clamps, arranging at least a portion of the display over the first groove, placing the clamp over the first groove and pressing the display medium with the clamp body into the first groove such that these are received tightly and clampingly within the groove. Unmounting of a display medium and/or replacement is similarly simple.

The fixation means facilitate fixation of the display medium to the frame while themselves being largely inconspicuous or even invisible. This allows an appealing presentation.

The connectors facilitate fixation of the display member by providing a provisional attachment of the display member with respect to the frame. The display member and the frame may be arranged in a particular relative position and orientation and be adjusted to the desired relative position for fixation with the fixation means. Thus, correct placement of the display is facilitated.

An embodiment comprises a flexible display medium comprising one or more attachment portions cooperating with the connectors, thus together forming cooperating connectors, for attaching the display medium to the sign. This increases the reliability and accuracy of the relative initial attachment of the display medium to the display portion or the frame thereof and further facilitates placement and fixation.

Suitably, the cooperating connectors comprise a connector and a corresponding portion, counterconnector and/or an aperture in the display medium. E.g., the cooperating connectors comprise one or more hooks, buttons, snaps clamps etc. on the one part (display portion or display member) and corresponding lashes, loops, eyes, holes, hooks, countersnaps etc., on the other part (display member or display portion, respectively).

Relative positioning and/or speed of attachment is facilitated if the frame and/or the display medium comprises one or more corners and the connectors are arranged at or near the one or more corners, since corners provide natural points of reference in an object.

In an embodiment, the connectors are configured to tension the display member, e.g. stretching it to some extent. Thus, (occurrence of) wrinkles, folds and/or other causes of unevenness and/or misalignment of the display medium with respect to the frame are reduced or prevented, facilitating a proper fixation of the display medium to the display portion and the display frame in particular cases.

In an embodiment, the connectors, or at least one of the cooperating connectors, comprise an elastic element, in particular an elastic band or cord, but a flexible inelastic member connected with an automated rolling-up mechanism (e.g. similar to a tape measure) may also be employed. This allows adaptation to tolerances and it facilitates providing a tensioning force as referred to above. It also facilitates storage of the connectors in a relatively small space.

Effectively, the connectors are attached to the frame, enabling a reliable connection and a predictable attachment of the display medium relative to the frame. However, it is to be noted that the connectors may take the form of one or more separate loose parts, e.g. elastic or inelastic bands attaching the display medium to the display portion.

In an embodiment, the sign is configured such that the connectors are hidden from view and/or the elements (i.e. weather influences such as rain, snow, wind, etc) and/or protected from access, at least upon fixation of the display medium to the frame by the fixation means. Here, access is meant: by an average adult human hand. Thus, the connectors are not only protected against external influences but also do not affect the presentation of the display.

In particular, the sign may comprise a cavity, e.g. being generally hollow, and the connectors are received in the cavity and covered by the fixation means and/or the display member when installed for displaying the display member.

In an embodiment, the frame has at least one second groove around the display portion, the second groove being adjacent to the first groove and outward from the first groove relative to the display portion. Further, the clamp has a flange, and the first and second grooves and the clamp are arrangeable such that on insertion of the clamp body into the first groove for clamping the display medium, the flange of the clamp covers the second groove.

Thus, the flexible display medium, e.g. a printed sheet such as paper, cloth, sail or tarp, may be clamped to the frame and pulled taut between opposing frame portions along the circumference. Excess rim portions of the display medium can be received and stored in the second groove and be hidden from sight by the flange. Any excess display medium material, e.g. due to tolerances in manufacturing, mounting and/or tightening of the display medium can be accommodated by storing the material neatly away into the second groove and covering that with the flange. Thus, the display medium may be rapidly mounted and/or exchanged to an aesthetically pleasing sign.

In an aspect, a method of manufacturing a sign as described herein may comprise providing a shell and a stand frame, a support pillar, a set of frame modules and a set of frame modules, the method further comprising inserting the stand frame in the shell, filling the shell with a heavy, flowable but hardenable substance e.g. concrete, allowing the substance to harden and thereby form an integrated structure comprising the shell, the stand frame and the substance to form a base portion of the sign, connecting the support pillar to the base portion and connecting the display portion to the support pillar by inserting the support pillar into the display portion. In the method, the shell is supplied to an operator without the heavy substance to reduce transport weight, and the base portion is filled with the heavy substance at a local distribution point and/on on the site of using the sign. In an embodiment, the shell is a hollow closed object with an inlet and possibly an outlet for the heavy substance, e.g. a tank fillable with water or sand. This facilitates filling and/or emptying the base portion on site.

The display portion and/or the support portion may be provided in the form of modular building blocks to be assembled at the local distribution point and/or on site.

In accordance with at least one aspect of the above, a method of displaying an image is provided. The method comprises fixing a flexible display member for displaying the image to a frame of a sign comprising a display portion configured to carry the flexible display medium, wherein the display portion comprises a frame at least partly surrounding the display portion and fixation means to fix the flexible display medium to the frame, the frame having at least one first groove around the display portion and the first groove having opposing first groove walls. The method further comprises the steps of attaching at least a portion of the display member to the frame and fixing the attached display medium to the frame with a clamp having a clamp body to be received in the first groove, wherein the fixing comprises clamping a portion of the display medium between the clamp body and at least one first groove wall of the first groove.

Thus, a two-step method is provided which facilitates mounting the display medium to the display portion for displaying the image.

An embodiment comprises attaching the display member to the frame; adjusting the relative positions of the display member and the frame, wherein at least a portion of the display member overlies the first groove; and fixing the display member and the frame by inserting the clamp into the first groove and clamping a portion of the flexible display medium between the clamp body and at least one first groove wall of the first groove. Thus a desired relative position of the display medium and the display portion is established and the display medium can be pulled taut, so that a clear and appealing display is provided.

An embodiment comprises the step of hiding the connectors from view, from the elements and/or from access, e.g. by fixation of the display medium to the frame by the fixation means. Thus, the connectors may be protected from weather and/or vandalism and the presentation of the image is not affected by the connectors.

BRIEF DESCRIPTION OF THE DRAWINGS

The above-described aspects will hereafter be more explained with further details and benefits with reference to the drawings showing an embodiment of the invention by way of example.

DETAILED DESCRIPTION OF EMBODIMENTS

Figure 3:
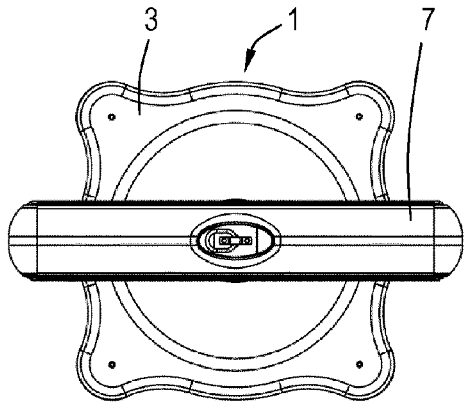
FIGS. 1-4 are perspective, perspective front and top views, respectively, of a sign.

It is noted that the drawings are schematic, not necessarily to scale and that details that are not required for understanding the present invention may have been omitted. The terms “upward”, “downward”, “below”, “above”, and the like relate to the embodiments as oriented in the drawings, unless otherwise specified. Further, elements that are at least substantially identical or that perform an at least substantially identical function are denoted by the same numeral.

Figure 1:
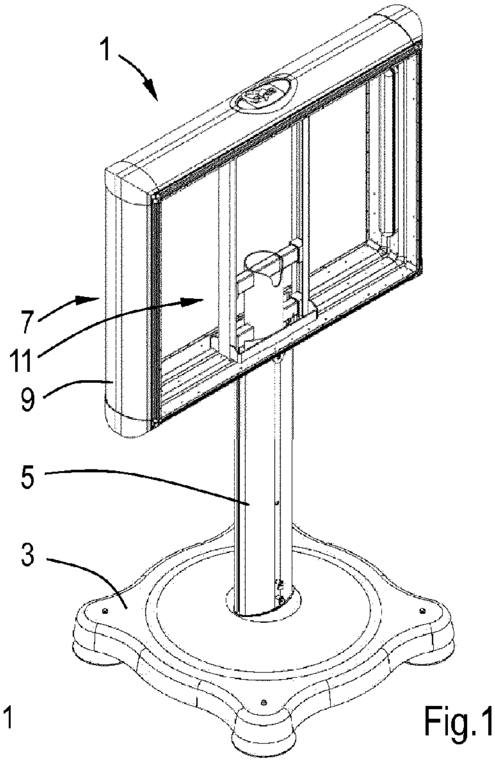
Figure 2:
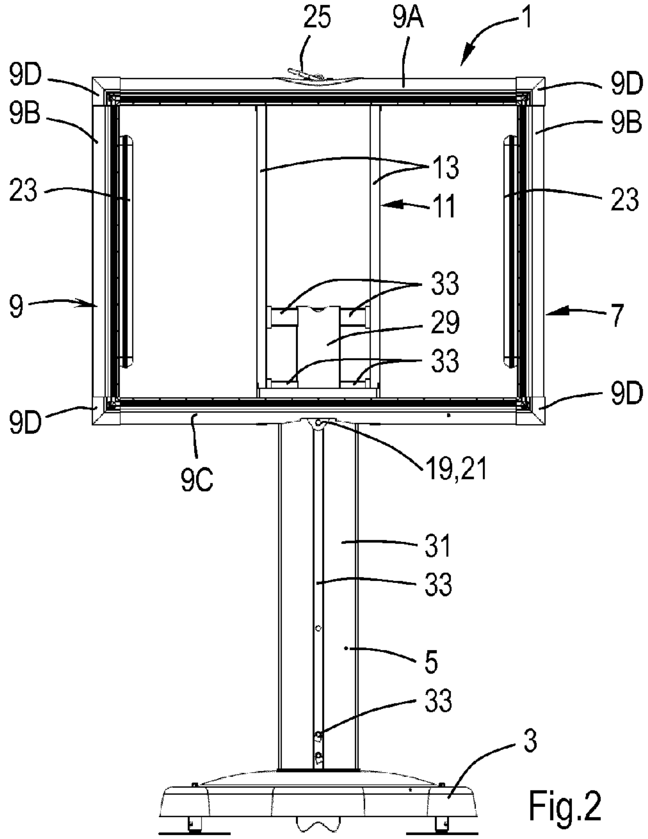
Figure 4:
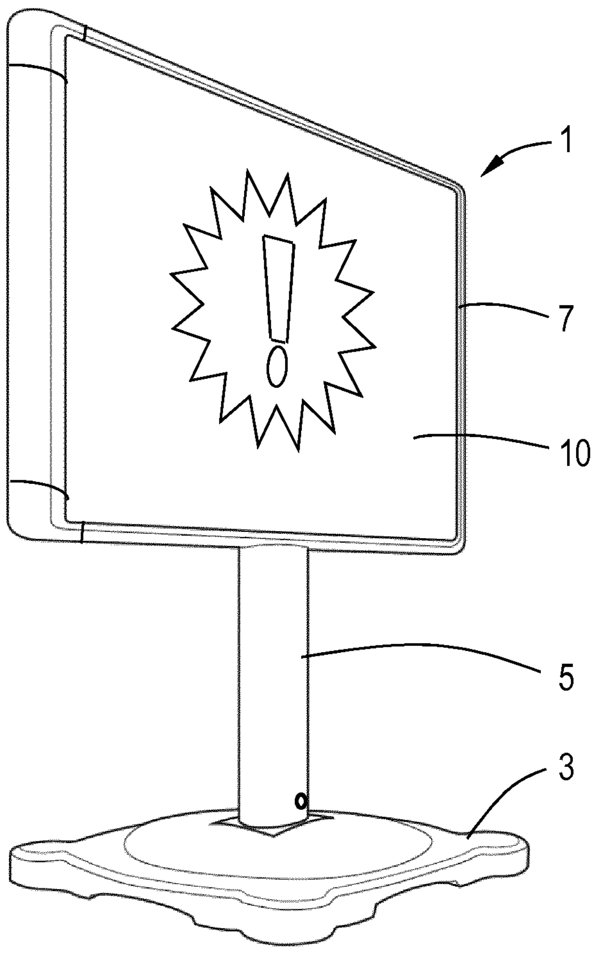
Figure 5:
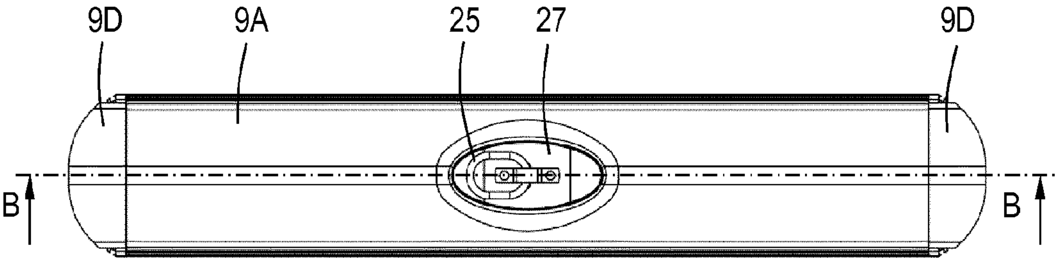
FIGS. 5-7 are top, cross section (B-B) and bottom views, respectively, of the display portion of the sign of FIGS. 1-3.
Figure 6:
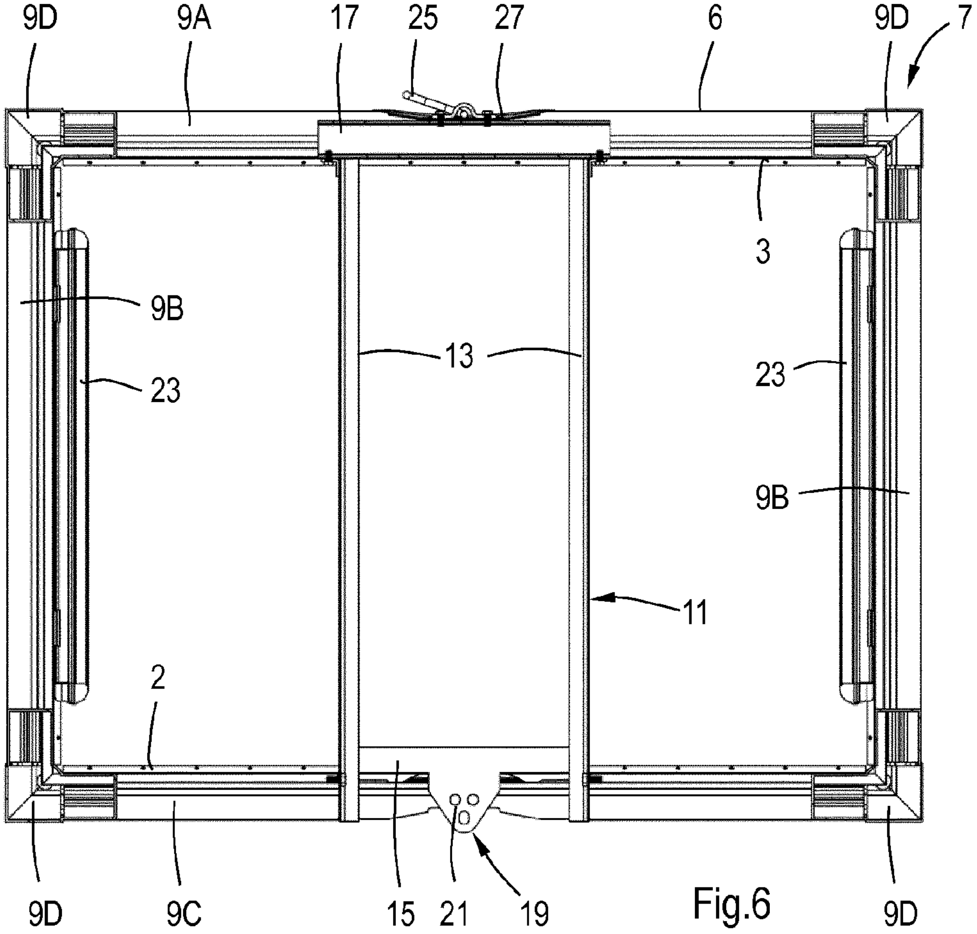
Figure 7:
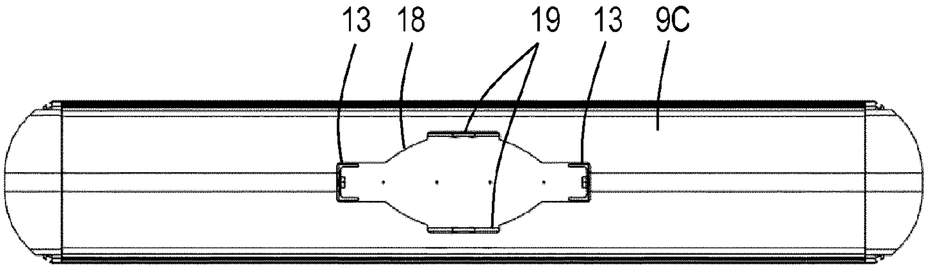

FIGS. 1-3 show a sign 1 comprising a base portion 3, a support portion 5, and a display portion 7. The display portion 7 comprises a frame 9 surrounding the display portion 7 and thereby defining a centre portion in which a display D on a display medium 10 may be shown as generally indicated in FIG. 4. FIGS. 5-7 show the display portion in different views, with FIG. 6 showing cross section B-B indicated in FIG. 5.

FIGS. 1, 2 and 6 show that the frame 9 here is generally hollow to save weight. The frame 9 comprises a top side 9A, left and right sides 9B and bottom side 9C, joined with corner blocks 9D. Inside the frame 9, a mounting structure 11 is provided, comprising opposing guide rails 13, here being generally U-shaped (FIG. 7), a bottom ring 15 and a top cap 17. In the bottom side 9C an opening 18 is provided granting access to (the rails 13 of) the mounting structure 11 (FIG. 7). The bottom ring 15 is provided with opposing cheek plates 19 having a hole 21 and extending from the frame 9 (FIGS. 2, 6). Further, optional light sources 23 are provided to illuminate (the display D on) the display medium 10 from within (FIGS. 1, 2, 6).

An eye shackle 25 is movably connected to the sign in a recess 27 on top side of the frame 9 providing a hoisting connection. When lying in the recess 27, the eye 25 is largely hidden from view from a normal view point if (the top side 9A of) the sign 1 is about 2.5 meters high or more.

The support portion 5 comprises an inner post 29 and a mantle 31 provided with through holes 33. The inner post 29 is provided with guides 33 that, when assembled, are slidably received in the guide rails 13 of the display portion 7 (FIG. 2). The mantle 31 surrounds and covers the inner post 29, improving aesthetics and protecting the inner post 29 from environmental factors. The mantle 31 is generally elliptical in transverse cross sectional shape, and fits inside the bottom ring 15 of the display portion. Thus, the display portion 7 is slidable over the support portion 5, enveloping the top end of the support portion 5. The oval or at least non-circular shape of the mantle 31, the opening 18 and the bottom ring 15 assists in preventing rotation of the display portion 7 with respect to the support portion.

The display portion 7 is arrangeable to the support portion 5 in a relatively high position (FIGS. 1, 2, 4), an intermediate position and a relatively low position (not shown) wherein the display portion 7 is slid downward over the support portion 5 so that the latter is received in the former and the sign 1 has minimum height. In the lowest configuration, the top cap 17 may rest on (the top end of) the support portion 5. To fix the display portion 7 to the support portion 5 in a desired relative position, a lock, e.g. a bolt or a pin, may be inserted through the holes 21 and 33. Other locking mechanisms may also be employed.

Figure 8:
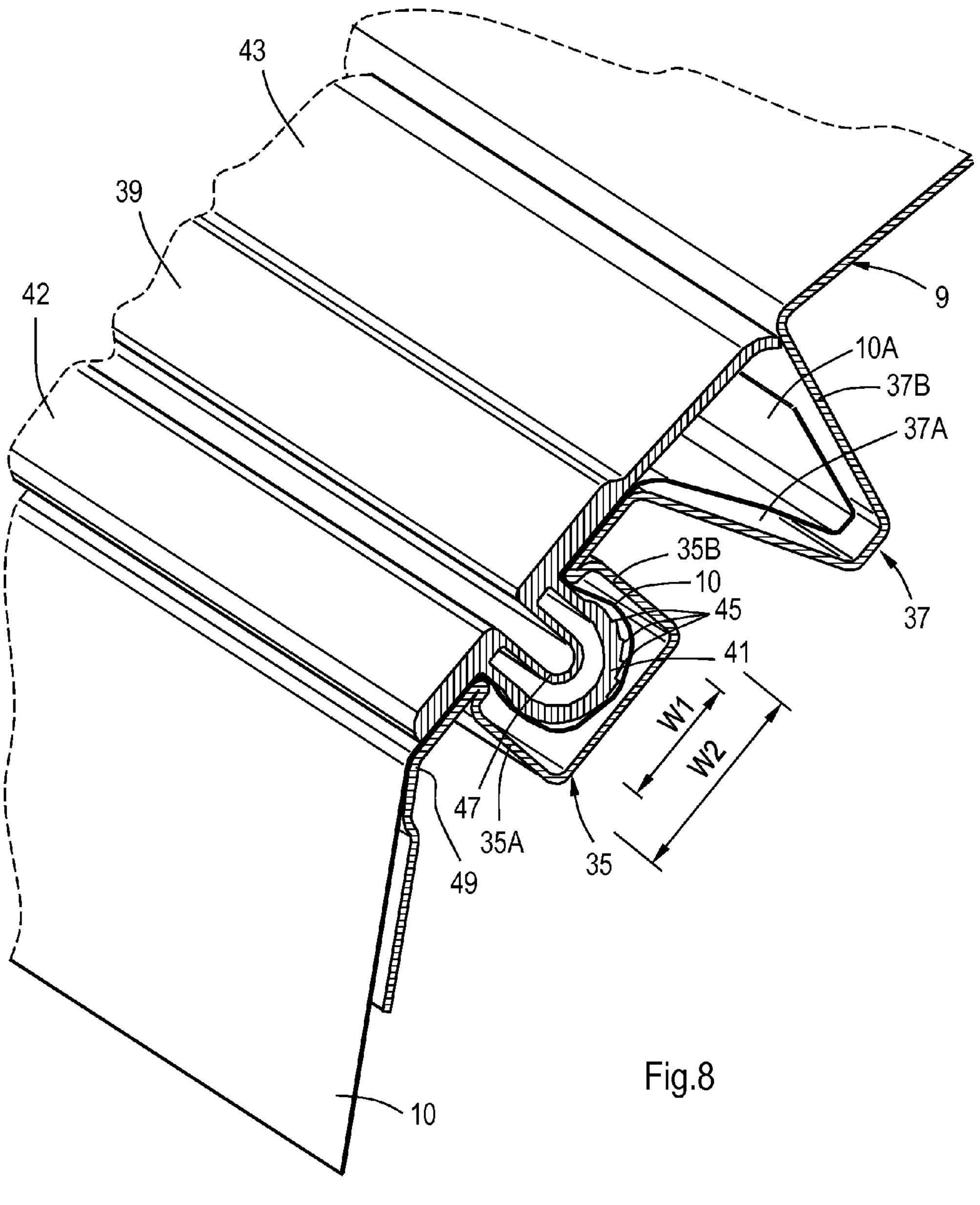
FIG. 8 is a partial cutaway view of the display portion of the sign of FIGS. 1-3, provided with a flexible display medium.
Figure 9:
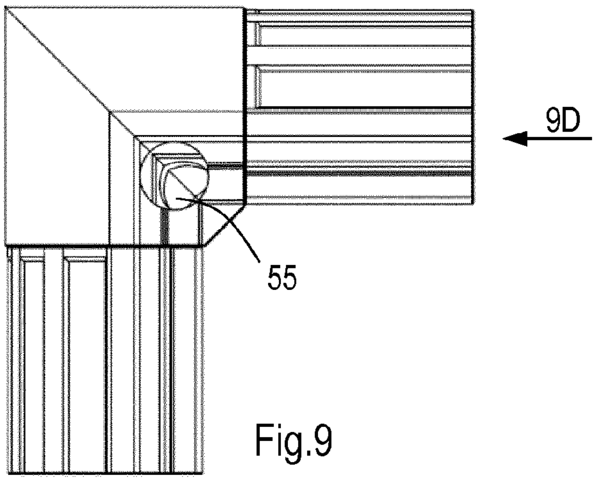
FIGS. 9-12 are front, side and perspective views, respectively, of a corner block for the sign frame of FIGS. 1-8.
Figure 10:
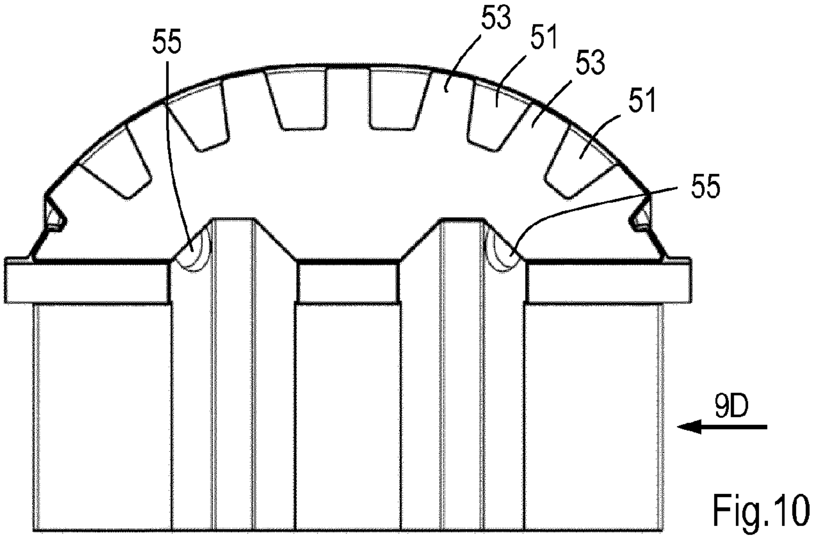
Figure 11:
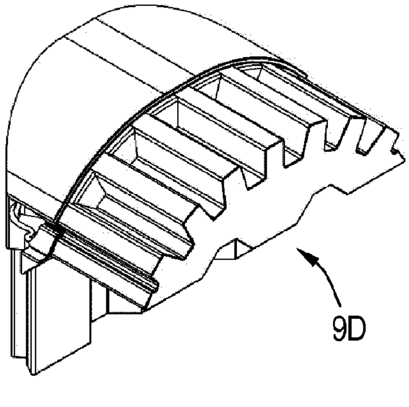
Figure 12:
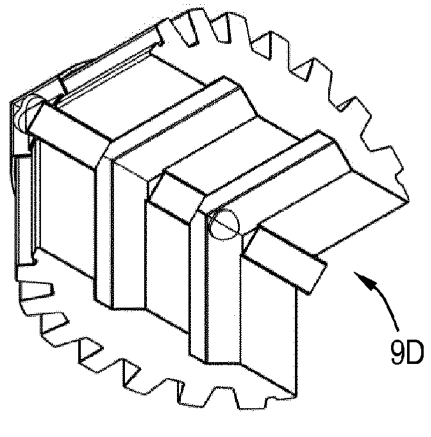

FIG. 8 shows a part of the frame 9, in cut-away view. The frame 9 preferably has a constant shape around the display portion 7, although segments with different shape may be provided as well. The frame 9 has sets of adjacent first and second grooves 35, 37 around the display portion, recessed into the frame 9. The second groove 37 is outward from the first groove 35 relative to the display medium 10 in the centre portion of the display portion 7. The first and second grooves 35, 37 have respective opposing first and second groove walls 35A, 35B; 37A, 37B. From FIG. 8 will be appreciated that the first groove 35 has an open shape, in transverse cross-section, being generally C-shaped with a relatively narrower entrance (width W1) and a relatively wider (width W2>W1) portion behind the entrance. Here, the second groove 37 is wider than the first groove 35, and the second groove 37 has an outwards flaring width giving it a general V-shape in transverse cross-section.

The sign 1 further comprises a clamp 39. The clamp 39 is an elongated object having a clamp body 41, a narrow flange 42 and a wide flange 43. In FIG. 8 the clamp body 41 is resiliently received in the first groove 35 and the flange 43 covers the second groove 37. The clamp 39 may be removed, e.g. by inserting a tool underneath a flange 42, 43.

The sign 1 comprises, in use as shown, a flexible display medium 10, e.g. a coated textile sheet carrying a printed image. The display medium 10 is arranged over and in the grooves 35, 37, thereafter the clamp 39 is inserted into the grooves 35, 37 with the display medium 10 in between. Thus, the clamp engages and comes to urge the display medium 10 against the entrance and/or a wall portion 35A, 35B of the first groove 35 and the display medium 10 is fixed to the frame 9. Any excess edge portion 10A of material of the display medium 10 can be stored in the second groove 37 and be neatly covered by the flange 43 of the clamp 39, hiding the edge portion 10A from view and environmental influences.

Visible in FIG. 8 is that the clamp body 41 has on its outer surface a number of toothed ribs 45 for engaging and/or gripping a portion of the flexible display medium 10 to increase the holding force onto the display medium 10. To increase the resiliency and therewith the holding force (and reliability) of the clamp 39, the clamp body 41 is hollow and is provided with an optional additional a spring portion 47. It is noted that a massive clamp 39 may be provided as well. Here, the frame 9 comprises a profiled plate, which may be provided by forming, e.g. milling, pressing, bending, rolling, etc. plate material and/or extrusion forming, and it is generally rigid. Thus, the resiliency for clamping must be provided by the clamp 39. In other embodiments, at least part of (the groove 35 of) the frame 9 may be formed resilient.

It is further noted that in FIG. 8, frame 9 comprises an edge 49 inward of the first groove 35 with respect to the centre portion of the display portion 7, so that the display medium 10 is bent over the edge 49 of the frame. This increases friction and reduces pulling forces of the display medium 10 on the clamp 39. Yet, the edge 49 being provided by a relatively small bend angle of about 30 degrees relative to an unbent frame portion, the groove 35 is still readily open towards and accessible from the front side of the display portion, being the side on which the display message D is to be shown. Further edges, ridges, protrusions, sticky material portions and/or other friction increasing structures may be provided on the frame 9 and/or the display medium 10.

The frame 9 (or rather, the frame sides 9A-9C) may be formed with self supporting structures or be connected with an interior structure, e.g. an interior plate so that a tubular frame is provided. This increases robustness of the display portion. Tubular frame parts may also be provided as unitary parts.

FIGS. 9-12 are different views of corner blocks 9D for use with the frame portion of FIG. 8. The corner blocks 9D may be inserted into the frame sides 9A-9C and fixed in any suitable manner, e.g. clamping, screwing, bolting, riveting, welding, gluing, etc. The corner blocks close the frame against environmental influences and they provide a pleasing appearance.

In the corner blocks 9D, grooves and ribs 51, 53 and holes 55 are provided. The grooves and ribs 51, 53 facilitate slight deformation for clamping of the corner block 9D into the frame 9. The holes 55 facilitate attachment of corners of a display medium 10, e.g. for initial phases of mounting a display medium before a clamp 39 is applied.

Figure 13A:
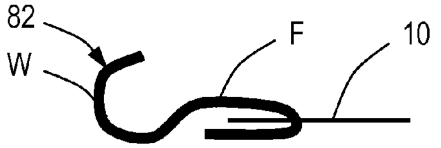
FIG. 13A is a side view of a hook and a display medium for attaching the display medium to the display portion.
Figure 13B:
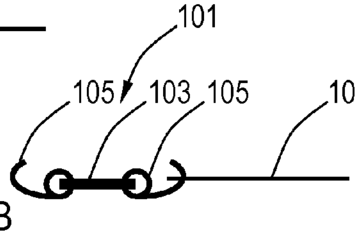
FIG. 13B is a side view of an elastic hook arrangement and a display medium for attaching the display medium to the display portion.

In an embodiment, the holes 55 in the corner blocks 9D form connectors for attaching corners of a display medium 10 to the display portion 7 in initial phases of mounting a display medium before a clamp 39 is applied to fix the display medium 10 to the frame 9. For that, connectors such as one or more hooks, shackles or the like may be used to connect (one or more corners of) the display medium 10 to (the corresponding ones of) the holes 55. A suitable hook 82 is shown in FIG. 13A and comprises a relatively flat portion F for penetrating the display medium 10 and holding it and a relatively wide portion W for engaging the corner block hole 55. Also or alternatively, and as shown in FIG. 13B, a connector 101 comprising an elastic band or cord 103 with hooks 105 on opposite ends for engaging the display medium and the frame, respectively, may be employed.

In an embodiment, the display medium 10 is not attached to (the corner block material surrounding and defining) a hole 55 itself, but it is attached through the hole 55 to an connectors, e.g. an eye, a cable, a hook, etc. received within the cavity of the display portion 7 or the frame 9.

Figure 14:
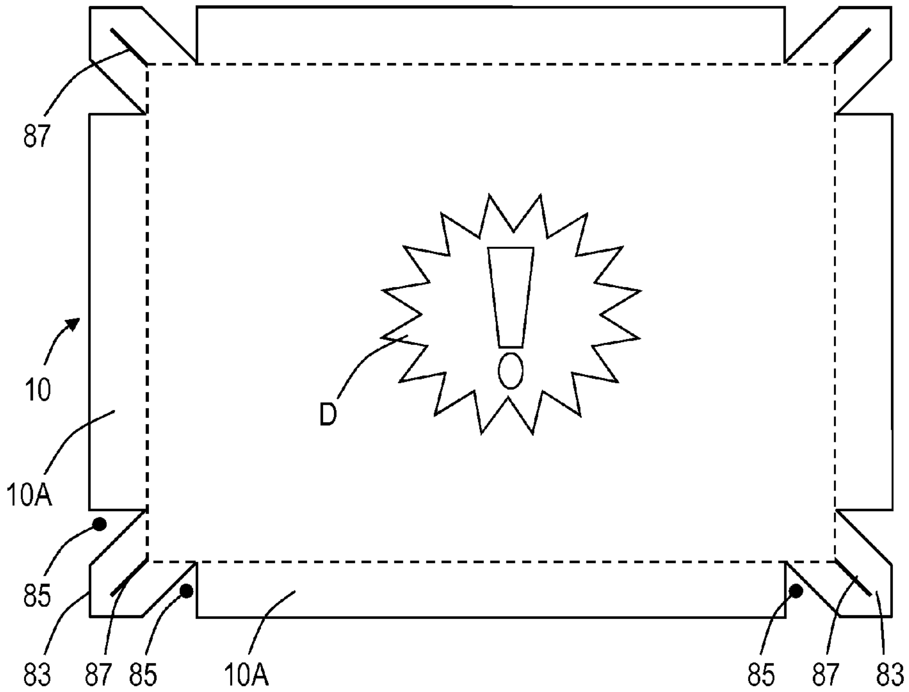
FIG. 14 shows an embodiment of a display medium.

An exemplary design of a suitable display medium 10 is shown in FIG. 14. The display medium 10 is of flexible material bearing an image D, e.g. a printed piece of cloth. In the corners, slits 83 are provided, like button holes, for being engaged by a hook (e.g. hook 82 of FIG. 13) or a button of suitable connectors of the sign 1. The display medium 10 may also or alternatively be provided with one or more pre-fabricated holes, rivets, hooks, loops, buttons etc.

In the rim of the display image 10 of FIG. 14, near the corners, cutouts 85 are provided resulting in separated edge portions 10A and strip-shaped attachment portions 87 comprising the slits 83. Cutouts at or near the corner facilitate forming the display medium about (the first grooves 35 of) the frame 9. Forming such attachment portion strips 87 facilitates fitting (the strips 87 of) the display medium material through the holes 55 into (the interior of) the display portion 7 and hiding the attachment portions 87 from view and direct access.

Figure 17:
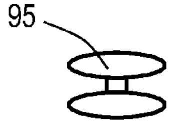
FIG. 17 is a side view of a connector for attaching a display medium to an connectors, e.g. according to FIG. 16.
Figure 15:
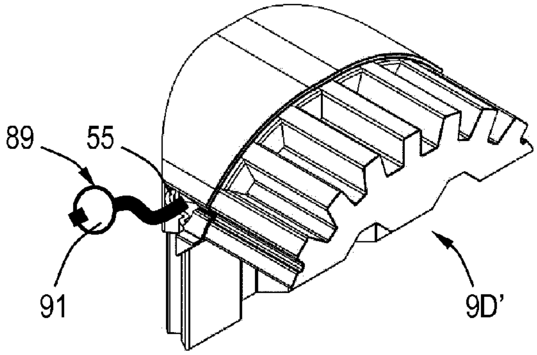
FIGS. 15-16 are perspective views of corner blocks with connectors.
Figure 16:
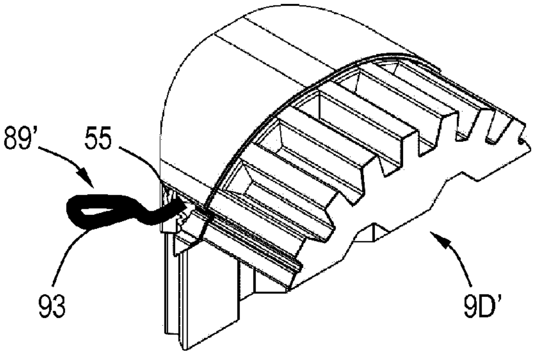

FIG. 15 indicates a corner block 9D' of a particular embodiment of the sign 1, configured for attaching a display medium 10, e.g. a display medium according to FIG. 13. In the embodiment, an elastic cord 89 is attached to the frame 9 within the display portion 7 (here, being attached to the corner block 9D'). The cord 89 is provided with a connector in the form of a button 91 to fit through a slit 83 and engage the display medium 10. In another embodiment (FIG. 16) a cord 89' may comprise a loop 93 and a hook, tie-ribbon, dumbbell-shaped button 95 (FIG. 17) and/or knot (not shown) may be used to attach the display member 10 to the cord 89'.

Upon attachment of the display medium 10 to (the frame 9 of) the display portion 7 of the sign, the display medium 10 can be accurately positioned with respect to the frame 9 and fixed in place by insertion of the clamps 39 into the first grooves 35 as described above. The corners of the display medium 10 with the cooperating connectors 83, 87, 89, 91 may be covered by dedicated corner clamps of similar construction to the clamps 39 but being generally rectangular or L-shaped, and/or by appropriately forming the clamps 39 with diagonally shaped ends (e.g. cut 45 degrees to the longitudinal direction) so that they are hidden from view and from the elements, as well as from direct access by passers-by, improving aesthetics of the sign and reducing chances of vandalism.

The display medium edge portions 10A may be left free from details of the image D and/or be coloured to match the colour of the clamps 39 and/or (the frame 9 of) the display portion 7, so that a certain tolerance in the relative position of the display medium 10 with respect to the clamps 39 is provided, at least at first glance. Also or alternatively one or more markings Dm may be provided to assist aligning the display medium and the frame 9.

Figure 18:
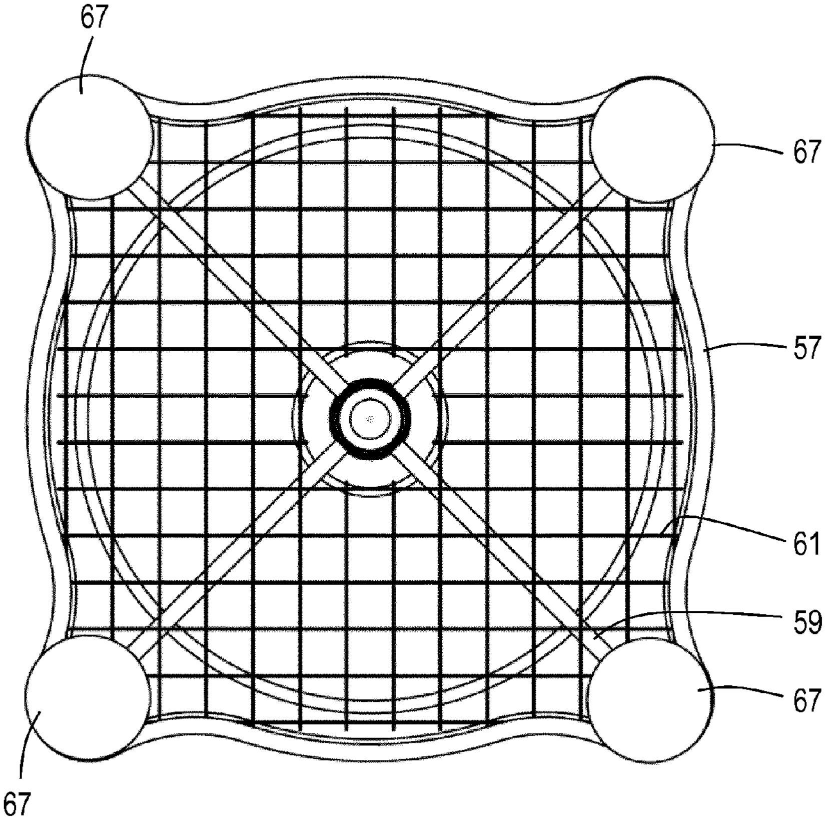
FIG. 18 is a bottom view of a base portion of the sign of FIGS. 1-3.
Figure 19:
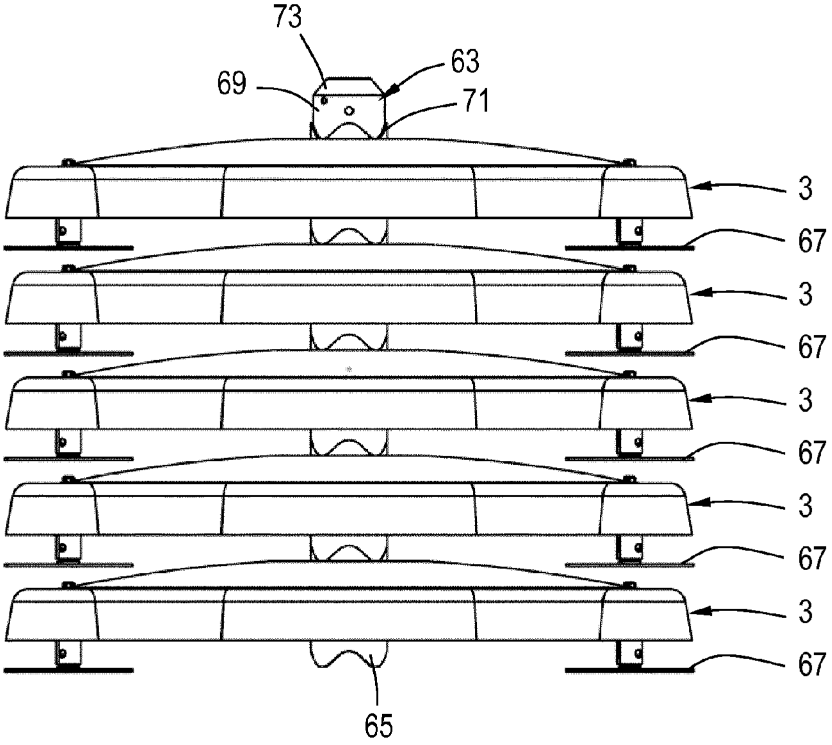
FIG. 19 is a side view of stacked base portions.
Figure 20:
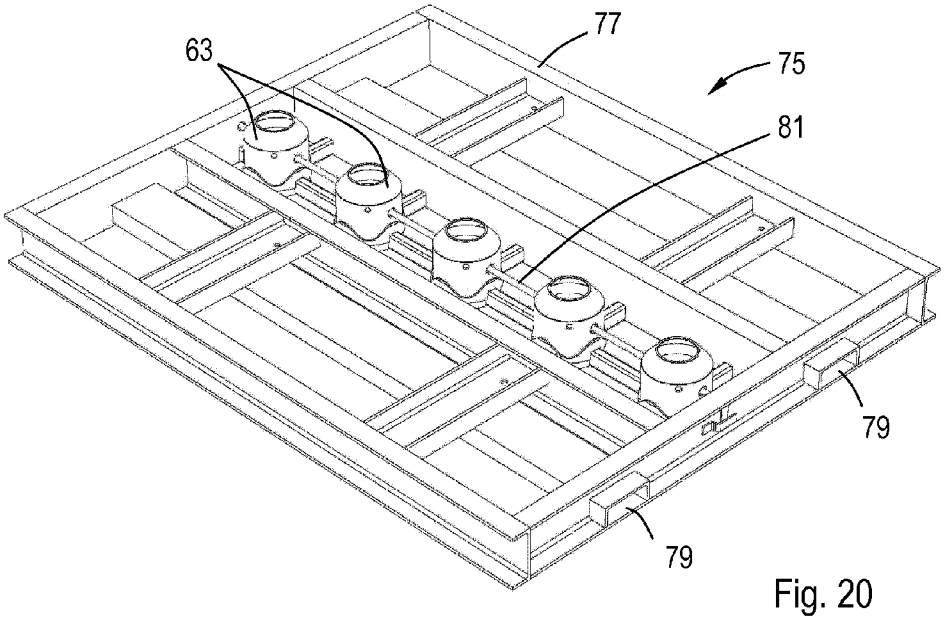
FIGS. 20-23 are perspective, top side and cross section (A-A) views, respectively, of a carrier for a plurality of display assemblies.
Figure 22:
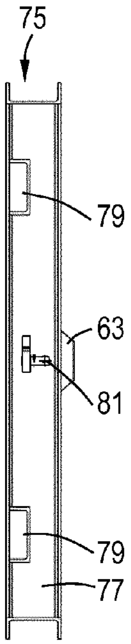
Figure 21:
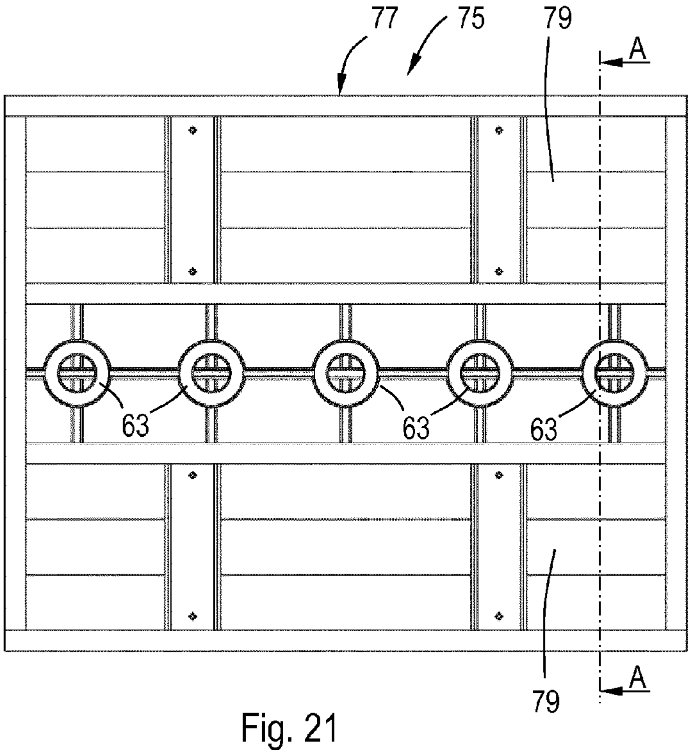
Figure 23:
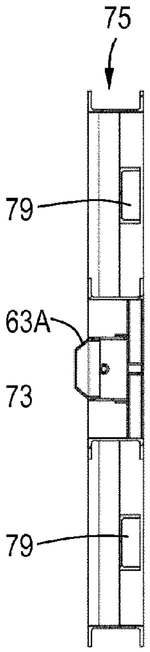

FIG. 18 shows a bottom view of the base portion 3 of the sign 1. FIG. 19 shows a number of such base portions 3 being substantially identical stacked on each other. The base portion 3 comprises a shell 57 filled with concrete (not shown) in which a stand frame 59 is partly embedded. A reinforcement structure, e.g. a grid 61, may be provided as well within the concrete. The stand frame 59 comprises a connector 63 for connecting to a support portion or another base portion, and an optional mated counterconnector 65. Further, optional adjustable levelling props 67 are provided, e.g. disks with a screw connection through the base portion, as shown here.

The shown support portion connector 63 comprises an inner wall 69 and an outer wall 71 surrounding the inner wall 69. The inner wall 69 is cylindrical with a tapered top 73 and the outer wall 71 has a profiled upper edge, here being undulating with four tips and four troughs but more, less and/or different guiding structures may be provided and the connector may be formed as an integral object. The inner post 29 of the support portion 5 comprises a complementary shape, e.g. here being a hollow cylinder with a complementary undulating bottom edge (not shown). Thus, the inner post 29 of the support portion 5 may be placed over the inner wall 69 of the connector 63 and arranged so that the respective undulations interengage and guide (the inner post 29 of) the support portion 5 into a predetermined relative position. There, (the inner post 29 of) the support portion 5 and (the connector 63 of) the base portion 3 may be locked by inserting a bolt or other device through (then) aligned holes through the respective parts 29, 63. The mantle 31 of the support portion may similarly also be locked in place or be attached differently.

The bottom connector of each base portion 3 is substantially similar to that of (the inner post 29 of) the support portion 5 and for transport and/or storage plural base portions 3 may be connected and stacked as shown in FIG. 19. For increased stability, the levelling props may be suitably adjusted so that one or more, e.g. each, base portions are supported on each other also by their levelling props (not shown).

FIGS. 20-23 show a carrier 75 for carrying plural support portions 5, with or without display portions 7 attached. The carrier comprises a frame 77 and a plurality, here five, connectors 63 for connecting support portions 5, being substantially identical to the connector 63 of the base portion 3 discussed before. The frame 77 comprises optional channels 79 for engagement by a fork lift.

Figure 24:
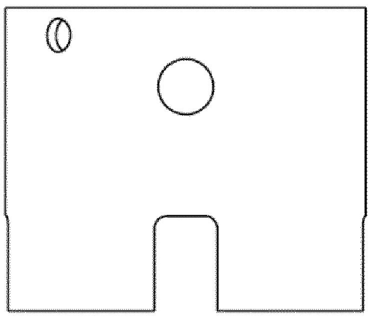
FIGS. 24-26 show parts of a connector for the carrier of FIGS. 20-23.
Figure 25:
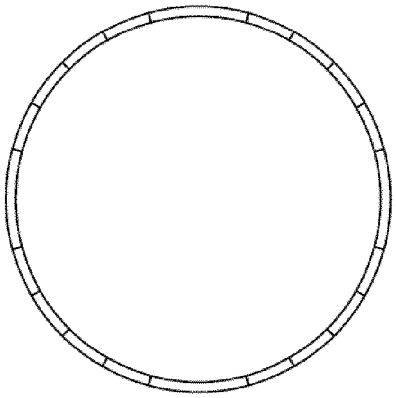
Figure 26:
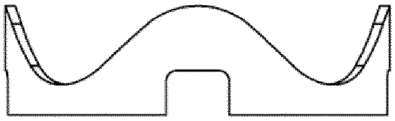
Figure 27:
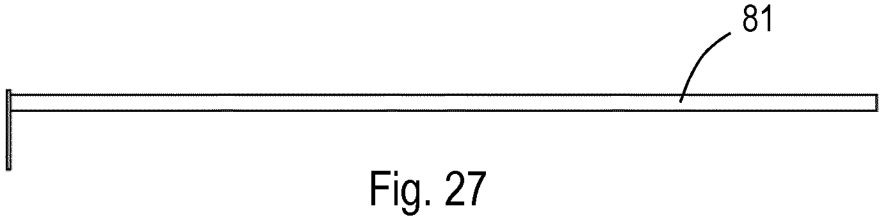
FIG. 27 shows a locking pin for the carrier of FIGS. 20-23.

Here, the connectors 63 are arranged on crossing beams of the frame 77, being formed with an inner wall 69A (FIG. 24) and a crown-shaped outer wall 71A having four peaks and four troughs (FIGS. 25-26). Also these connectors 63 are provided with optional tapered tops 73 that help guide the support portion 5 onto the connector 63. A lock, e.g. a long skewer 81 (FIG. 27), may be inserted through the carrier 75 and the connectors 63 (FIG. 20) to lock any support structure arranged thereon to the carrier 75, preventing that they could fall off during transport.

The invention is not restricted to the above described embodiments which can be varied in a number of ways within the scope of the claims. For instance the display portion may have a different size or shape, e.g. square, upright rectangular, hexagonal, octagonal etc, using appropriate corner blocks. The term "corner block" does not mean that the blocks are unitary and/or solid although that may be the case in an embodiment. Hollow blocks reduce weight compared to massive blocks.

Clamps may extend continuously along entire frame portions or plural adjacent short clamps may be provided.

With some modifications, one skilled in the art may extend the embodiments described herein to other architectures, networks, or technologies.

The sign may be provided with an electrical power supply such as one or more solar power panels and/or a battery, etc.

Elements and aspects discussed for or in relation with a particular embodiment may be suitably combined with elements and aspects of other embodiments, unless explicitly stated otherwise.

The invention claimed is:

1. A transportable sign for temporary outdoor advertising comprising a base portion, a support portion, a clamp, a display portion configured to carry a flexible display medium to display an image and cooperating connectors, wherein the base portion positions the sign by supporting the support portion and the display portion and the support portion supports the display portion, when mounted to or on the base portion;

the display portion includes a self-supporting frame at least partly surrounding the display portion and having sets of adjacent first and second grooves around the display portion, the second groove being outward from the first groove relative to the display portion, and the first groove having opposing first groove walls, the clamp having a C-shaped clamp body received in the first groove and having a flange, the first groove having an open shape, in transverse cross-section, being substantially C-shaped with a relatively narrower entrance and a relatively wider portion behind the entrance, wherein the first groove and the clamp fix the flexible display medium to the frame by clamping the flexible display medium between the clamp body and at least one of the opposing first groove walls on insertion of the clamp body into the first groove, the first and second grooves and the clamp are arranged such that on insertion of the clamp body with its C-shaped opening outward into the first groove, the clamp body engages and comes to urge the display medium against the entrance and/or a wall portion of the first groove and the flange of the clamp covers the second groove, and the cooperating connectors are configured to attach the flexible display medium to the sign prior to fixing the flexible display medium to the frame with the first groove and the clamp.

2. The sign according to claim 1, wherein the display portion has a front side for displaying the image and the first and second grooves are recessed into the frame and are open generally towards the front side.

3. The sign according to claim 2, wherein the first groove has one of the opposing first groove walls on an inward side relative to the display portion, said one first groove wall extending into the frame at an angle that is at least perpendicular to the front side, has and having a rim portion protruding into the groove.

4. The sign according to claim 1, wherein the first groove has one of the opposing first groove walls on an inward side relative to the display portion, said one first groove wall extending into the frame at an angle that is at least perpendicular to the front side, and having a rim portion protruding into the groove.

5. The sign according to claim 1, wherein the clamp body has one or more portions with toothed ribs for engaging and/or gripping a portion of the flexible display medium.

6. The sign according to claim 1, wherein at least an entrance of the second groove is relatively wider than the entrance of the first groove.

7. The sign according to claim 6, wherein the display portion envelops the support portion and is slidable over the support portion and fixable to the support portion in at least two different relative positions.

8. The sign according to claim 1, wherein the base portion and the support portion comprise a first connector and a mated second connector for releasably coupling the base portion and the support portion, and the first connector and the second connector comprise guiding features to guide the base portion and the support portion into predetermined relative orientations.

9. The sign according to claim 8, wherein the base portion comprises the first connector and a mated third connector, such that two generally similar or identical base portions are connectable to each other via their first and third connectors, respectively.

10. The sign according to claim 9, wherein the third connector is substantially identical to the second connector of the support portion.

11. The sign according to claim 1, wherein the base portion comprises a levelling prop which is height-adjustable with respect to the base portion.

12. The sign according to claim 1, wherein the sign comprises a hoisting connection, comprising an eye or a hook that is movably connected to the sign in a recess on top of the sign.

13. The sign according to claim 1, wherein the connectors are configured to tension the display member.

14. The sign according to claim 13, wherein the connectors or at least one of the cooperating connectors comprises an elastic element.

15. The sign according to claim 14, wherein the connectors or at least one of the cooperating connectors comprises an elastic band or cord.

16. The sign of claim 1, wherein the sign is configured such that the connectors are hidden from view, from the elements and/or from access, at least upon fixation of the display medium to the frame by the first groove and clamp.

17. The sign according to claim 16, comprising a cavity and wherein the connectors are received in the cavity and covered by at least part of the clamp and/or the display member when installed for displaying the display member.

18. The sign according to claim 1, wherein the display portion is mounted or mountable to the support portion to form a transformable assembly such that, when mounted to the base portion, the display portion is positionable in and movable over the support portion between at least a first, relatively high position and a second, relatively low position with respect to the base portion.

* * * * *